(12) United States Patent
Hohl et al.

(10) Patent No.: US 11,803,808 B2
(45) Date of Patent: Oct. 31, 2023

(54) STORAGE SHELF FOR STORAGE DEVICE WITH A SENSOR STRIP THAT CAN BE APPLIED TO THE LOWER SIDE FOR OPTICALLY DETECTING STOCK THAT CAN BE STORED ON THE UPPER SIDE

(71) Applicant: Würth International AG, Chur (CH)

(72) Inventors: Wolfgang Hohl, Künzelsau (DE); Johannes Starke, Ellhofen (DE); Simon Koch, Dörzbach (DE)

(73) Assignee: Würth International AG, Chur (CH)

( * ) Notice: Subject to any disclaimer, the term of this patent is extended or adjusted under 35 U.S.C. 154(b) by 744 days.

(21) Appl. No.: 16/631,808

(22) PCT Filed: Jul. 26, 2018

(86) PCT No.: PCT/EP2018/070281
§ 371 (c)(1),
(2) Date: Jan. 16, 2020

(87) PCT Pub. No.: WO2019/020743
PCT Pub. Date: Jan. 31, 2019

(65) Prior Publication Data
US 2020/0167719 A1    May 28, 2020

(30) Foreign Application Priority Data
Jul. 28, 2017   (DE) .......................... 102017117177.0

(51) Int. Cl.
*G06Q 10/08*     (2023.01)
*B65G 1/02*      (2006.01)
*G06Q 10/087*    (2023.01)

(52) U.S. Cl.
CPC .......... *G06Q 10/087* (2013.01); *B65G 1/023* (2013.01)

(58) Field of Classification Search
CPC .. G06Q 10/087; G06Q 10/0875; B65G 1/023; A47F 2010/025; A47F 5/0043
See application file for complete search history.

(56) References Cited

U.S. PATENT DOCUMENTS 8,812,378 B2 *  8/2014  Swafford, Jr. .......... G07F 11/38
                                                  705/28
9,167,914 B2 * 10/2015  Rankin, VI ............. A47F 11/10
(Continued)

FOREIGN PATENT DOCUMENTS

DE        19714799 A1    10/1998
DE     102015120000 A1     5/2017
(Continued)

OTHER PUBLICATIONS

Workman, C.; Office Action in Application No. 3,071,206 in Canada; pp. 1-7; dated Mar. 5, 2021; Canadian Intellectual Property Office; 50 Victoria Street, Place du Portage 1, Gatineau, Quebec, Canada, K1A OC9.

(Continued)

*Primary Examiner* — Stanton L Krycinski
(74) *Attorney, Agent, or Firm* — Robert A. Blaha; Smith Tempel Blaha LLC (57) ABSTRACT

A storage insert for inserting in a storage device, having a storage body with an upper side for receiving storage goods, a lower side with receiving structures in a receiving region for receiving a sensor rail, and at least one optically transparent section between the receiving region and the upper side, and having the sensor rail, which is configured to be received in the receiving region by the receiving structures, and which has at least one sensor element in the region of the at least one optically transparent section is illustrated and described. The storage body is formed as a punched and bent storage sheet.

14 Claims, 5 Drawing Sheets

(56) References Cited

U.S. PATENT DOCUMENTS

| | | | |
|---|---|---|---|
| 9,275,361 B2* | 3/2016 | Meyer | G06Q 10/087 |
| 9,727,838 B2* | 8/2017 | Campbell | G06Q 10/087 |
| 9,928,698 B2* | 3/2018 | Farrow | G06Q 10/00 |
| 10,121,034 B1* | 11/2018 | Bathurst | G06K 7/10 |
| 10,371,786 B1* | 8/2019 | Orlov | G01S 5/0284 |
| 10,466,095 B1* | 11/2019 | O'Neill | G01G 19/42 |
| 10,548,418 B2* | 2/2020 | Gentile | G06K 19/0716 |
| 10,732,026 B1* | 8/2020 | Danenberg | H05K 5/0073 |
| 10,952,551 B2* | 3/2021 | Wittig | B65G 1/04 |
| 10,976,191 B2* | 4/2021 | Bühlmeyer | A47F 10/02 |
| 11,222,306 B2* | 1/2022 | Sun | G06Q 10/087 |
| 2005/0168345 A1* | 8/2005 | Swafford, Jr. | G08B 13/19697 |
| | | | 340/686.1 |
| 2007/0016494 A1 | 1/2007 | Brown et al. | |
| 2011/0215060 A1* | 9/2011 | Niederhuefner | A47F 1/125 |
| | | | 211/59.3 |
| 2014/0114708 A1* | 4/2014 | Campbell | G06Q 30/0201 |
| | | | 705/7.11 |
| 2014/0201042 A1 | 7/2014 | Meyer | |
| 2016/0048798 A1 | 2/2016 | Meyer et al. | |
| 2016/0134930 A1* | 5/2016 | Swafford | A47F 5/0068 |
| | | | 725/80 |
| 2017/0185952 A1* | 6/2017 | Albertus | G06Q 20/203 |
| 2019/0147395 A1* | 5/2019 | Wittig | G06Q 10/087 |
| | | | 705/28 |

FOREIGN PATENT DOCUMENTS

| | | |
|---|---|---|
| RU | 2216037 C2 | 11/2003 |
| WO | 2017084649 A1 | 5/2017 |

OTHER PUBLICATIONS

Search Report in Patent Application 2020104448 in Russia, dated Mar. 16, 2020, pp. 1-3; Russian Patent Office, Moscow, 125993, Russian Federation.

* cited by examiner

STORAGE SHELF FOR STORAGE DEVICE WITH A SENSOR STRIP THAT CAN BE APPLIED TO THE LOWER SIDE FOR OPTICALLY DETECTING STOCK THAT CAN BE STORED ON THE UPPER SIDE

CROSS-REFERENCE TO RELATED APPLICATIONS

The present application is a national phase application derived from international patent application no. PCT/EP2018/070281, filed on Jul. 26, 2018, which claims priority including the benefit of the filing date of German patent application no. DE 10 2017 117 177.0, filed on Jul. 28, 2017, both applications of which are incorporated herein by reference in their respective entirety.

TECHNICAL FIELD

The invention relates to a storage insert, a storage device, a storage management system, and a use.

TECHNOLOGICAL BACKGROUND

The logistical handling of large warehouses conventionally represents a great challenge in particular, if the quantity of goods is large, the types of goods are strongly diversified, the goods and the inventory of goods are subject to a frequent change, and the individual storage locations of the goods are spatially far from each other and/or also frequently change the storage locations.

Such stocks of inventory are conventionally managed in a computer-based manner. Persons decentrally control the stocks of inventory and reorder goods on request locally. This method is slow, time-consuming, labor-intensive and requires many decentral resources due to the local processing of individual stocks of inventory.

From WO 2017/084649, there is known a storage device having rack shelves, to which optical sensors are associated in order to record the filling and/or the filling level of the rack shelves with goods. WO 2017/086469 discloses a device for storing piece goods (or unit loads), having at least one shelf having an upper side, on which the piece goods is storable in a surveillance space, and having a lower side and having openings, which run from the upper side to the lower side, as well as signal transducers with associated signal receivers, wherein at least one sort is arranged in the openings at the lower side and a signal of the signal transducers is detectable by the signal receiver, as well as a control electronics having a control system, which supply the signal transducers and signal receivers with current as well as process signals of the signal receivers as well as identify the latter in order to identify an occupancy state of the surveillance space with piece goods on the basis of the presence of a signal at the respective signal receiver.

DE 197 14 799 A1 discloses a storage surface provided with detectors. The storage surface can be formed as a rack shelf. The detectors may be formed as pressure sensors, weight sensors, mechanical switches, inductive or capacitive sensors. The signal lines leading to the detectors and the associated detectors are arranged on circuit board stripes. A connection of the conductor stripes to a signal storage is effected via a plug socket arranged at an edge of the storage surface and a plug that is insertable into the plug socket.

US 2005/0168345 A1 and US 2007/0016494 A1 disclose respectively a storage plate having sensors.

SUMMARY

There may be a need to enable a surveillance of a stock of inventory with little effort and high precision.

This need may be satisfied by the subjects according to the independent patent claims. Preferred embodiments result from the dependent patent claims.

According to an embodiment example of the present invention, there is established a storage insert (or bearing insert) (in particular formed for inserting in a storage device), wherein the storage insert has an (in particular plane) storage body having an upper side (or top side) for receiving storage goods (or stack goods), having a lower side (or bottom side) having receiving structures in a receiving region for receiving a sensor rail, and having at least one optically transparent section between the receiving region and the top side, and the sensor rail, which is configured to be received in the receiving region by the receiving structures (in particular reversibly, detachably or exchangeably) and which has at least one sensor element in the region of the at least one optically transparent section.

According to another embodiment example, there is provided a storage device (or bearing device), which has the mounting structures (or attachment structures) for attaching at least one storage insert (in particular plural storage inserts) as well as at least one storage insert (in particular plural storage inserts) having the features described above, which storage insert is attached or attachable to the mounting structures.

According to still another embodiment example of the present invention, there is established a storage management system, which has a plurality of storage devices having the features described above and a management device, which is configured to manage a stock of inventory of storage goods on the storage inserts based on sensor signals of the sensor elements (in particular based on sensor signals of the sensors transmitted by the management device or already evaluated sensor results).

According to still another embodiment example of the present invention, a storage insert having the features described above, or a storage device having the features described above, or a storage management system having the features described above is used for managing a stock of inventory of storage goods on the top side of the storage insert.

OVERVIEW OF EMBODIMENTS

In the framework of this application, the expression "storage insert" (or bearing insert) can be understood to refer in particular to a modular planar (or two-dimensional) component part, which may serve for receiving storage goods, if the storage insert is mounted and/or inserted to mounting structures of a storage device (for example a rack or a cabinet). For example, such a storage insert may be a shelf (or panel) of a rack or a cabinet.

In the framework of this application, the expression "storage body" (or bearing body) can be understood to refer in particular to a planar structure, for example a plate or a shaped sheet (or plate), which may form the structural basis of a storage insert. Features may be provided or structures may be formed at and/or in the storage body, in order to establish functionality of a storage insert that may extend beyond the mere receiving of storage goods, in particular in connection with the sensoric registration (or determination) of storage goods.

In the framework of this application, the expression "sensor rail" (or sensor strip) can be understood to refer in particular to an elongated body, to and/or in which at least a part of the sensor functionality of a storage insert is implemented. A sensor rail may have a strip-shaped form having a length, which may amount in particular to the threefold, in particular at least the fivefold, further in particular at least the tenfold of a width of the sensor rail. In particular, a sensor rail may support one or plural sensor elements, which is or are configured for registering sensor data.

In the framework of this application, the expression "storage device" may be understood in particular to refer to a box-type rack (or frame) having one or preferably plural storage inserts, which may be configured for setting up, laying down, storing, etc. of storage goods. Such a rack may stand on the ground and/or be attached to a wall. For example, the storage device may be configured as a storage rack or a storage cabinet. If such a rack is at least partially open, it may be configured for example as a storage rack. In an embodiment as a cabinet, the rack may be provided with doors, which may optionally be lockable.

In the framework of this application, the expression "storage management system" may be understood to refer in particular to an arrangement of storage devices, which may be filled wholly or partially with storage goods or may be unfilled, and may be managed by the system. The degree of filling may be registered sensorically specifically for storage goods and/or specifically for storage space. A management device, which may be configured for example as a processor, may perform or trigger automatically a re-ordering on the basis of the sensorically determined degrees of filling of the storage devices with the different types of storage goods, in particular if a remaining stock of a respective storage good has decreased below a predeterminable threshold value.

In the framework of this application, the expression "storage goods" (or stock goods) may be understood to refer in particular to a marketable physical body, which, together with many other goods elements, may form a stock of inventory, which may be subject to a continuous change. Examples for such storage goods or goods elements may be in particular technical objects or components, such as for example tool components (for example hammer, screwdriver, etc.) or consumption components (such as for example screws, nails, dowels, etc.). Examples for a kind and/or type of a storage goods or a good's elements may be the contents of a suitcase, a machine component, the contents of a machine case, tool inlays, canisters, cans, bottles, cartridges, tubes and/or contents of drawers. Storage goods, such for example bulk good, may also be stored in storage boxes or cardboards.

In the framework of this application, the expression "sensor element" may be understood to refer in particular to a device for registering (or determining) the presence or absence and/or the degree of filling of one or plural storage goods in and/or at a specific storage insert or in and/or at a specific position at the top side of a storage body. A respective sensor element may be configured for receiving at least one parameter, which is indicative for the presence or absence or for the degree of filling of one or plural storage goods at an associated position of an associated storage insert. To this end, the respective sensor element may be arranged in a region of the optically transparent section and may thereby sample (or measure), preferably optically, the local presence or non-presence of storage goods, to the extent that the optically transparent section is covered or not covered by storage goods.

According to an exemplary embodiment example of the invention, there is established a storage insert (or bearing insert) (for example a shelf) for a storage device (for example a rack), which may have a receiving volume for receiving storage goods at a top side of a storage body. The storage good may cover, if it is present, an associated optically transparent section (for example a through-boring) in the storage body. At a lower side of the storage body, there may be provided a sensor rail having one or preferably plural sensor elements, the positions of which correspond to the positions of the preferably plural optically transparent sections. By a mere inserting of such a sensor rail, preferably plural sensor rails, in associated receiving regions at the lower side of the storage body, the sensor elements provided at the sensor rail may, guided by receiving structures at the lower side of the storage body, be brought in operative connection with the optically transparent sections. The receiving volume for the storage goods may thus not be disturbed by this attachment of a sensor system. By the technically easy formation of receiving structures at the lower side of the storage body it may be enabled intuitively for a user to mount the sensor rails without the risk of operating errors and precisely to the conceived positions. Thereby, a fully automatic and error-robust surveillance system may be provided even for large and strongly diversified inventories of storage goods by simple means, which surveillance system may be operated error-freely by a user also without special expert knowledge.

In the following, additional embodiment examples of the storage insert, the storage device, the storage management system and the use are described.

The storage body may be formed as a storage plate (or bearing plate), in particular as a storage sheet, further in particular as a punched and at least section-wise bent storage sheet. The storage body may thus be configured as a planar component, which may be of advantage both in view of the arrangement of a large number of storage goods at its top side and also with respect to the arrangement of a large number of sensor rails at its lower side. For example, such a storage plate may be manufactured from a metallic sheet, which only may need to be punched (or stamped) for forming the receiving structures and the optically transparent sections and for attaching to the mounting structures (or attachment structures) of the storage device as well as for shaping the form of the receiving structures. Further manufacturing steps may be dispensable. In this manner, an effective storage insert may be manufactured with simple means.

According to an embodiment example, a receiving volume for receiving the storage goods may be delimited at the top side of the storage body—in particular by (preferably vertical) delimitation walls. Stated more precisely, the top side of the storage body may be divided into a plurality of storage regions, wherein a special type of storage goods, one or preferably plural optically transparent sections as well as a corresponding sensor rail may be associated to each storage region. In this manner, a management device of a storage management system may assign to a specific sensor rail of a storage insert an associated type of storage goods. Sensor signals of the sensor elements of this sensor rail may then be directly indicative for the management device for a remaining stock of inventory of this specifically assigned type of storage goods (for example M8 screws) at the storage location of the storage body.

According to an embodiment example, the receiving structures may be configured for, in particular drawer-type, pushing in or pulling out of the sensor rail. The receiving structures then may form a guidance for the drawer-type mounting of a respective sensor rail in the associated receiving region with receiving structures. For this purpose, the receiving structures may hold the sensor rail at a left side and a right side of a sensor rail to be inserted, and may define its insertion direction.

According to an embodiment example, the receiving structures may have a mechanical stop for defining an end position of the received sensor rail. Such a mechanical stop may be formed as a protrusion at the lower side of the storage body. If, upon pushing in the sensor rail along the receiving structures, a front side of the sensor rail strikes against this protrusion, a further pushing in (or inserting) of the sensor rail along the receiving structures may be made impossible mechanically. The striking of the sensor rail against the mechanical stop may provide to a user also a haptic feedback, which may indicate the successful termination of an insertion process. The event of the striking against thus may also ensure an error-robust insertion of the sensor rail up to such a position. If the front side of the sensor rail strikes against the mechanical stop, the sensor elements of this sensor rail may be automatically aligned correctly to the optically transparent sections, which may guarantee an error-free and precise sensor system.

According to an embodiment example, the receiving structures may be formed as notches (in particular as L-shaped and/or V-shaped notches) in the storage body. Such a notch may be made in a plate-type storage body (for example a metal sheet) by forming a for example L-shaped or V-shaped opening and by a subsequent pressing out of a tongue of the storage body defined by the opening. A notch may be a section-wise excavated and angled bending section of a storage body that may be formed as a punched and bent sheet. Such tongues, which may have been pushed out of the plane of the storage body, may then function as receiving structures and/or mechanical stop for the sensor rail. In this manner, very precise receiving structures may be established by simple means, which structures may be formed integrally (in particular in one piece and/or in one material) with the storage body.

According to an embodiment example, the at least one optically transparent section may be formed as a through-boring in the storage body. If an optically sensitive sensor element of the sensor rail is arranged directly underneath a through-boring in the storage body, an optical signal that may be detectable by this sensor element may be dependent on whether this through-boring is covered by storage goods or is free of storage goods. The forming of an optically transparent section by a mere through-boring in the storage body may provide, in cooperation with the aligned sensor element of the sensor rail, a simple and error-robust optical detection system, which may reliably recognize a stock of inventory above the through-boring.

A sensor and/or a sensor element may have an emitter element for emitting electromagnetic primary radiation and a detector element for detecting electromagnetic secondary radiation in reaction to an emitting of electromagnetic primary radiation. However, it may also be possible to embody such a sensor and/or such a sensor element only as a detector element, which may detect daylight and/or illumination light without a sensor-specific emitter element being provided.

According to an embodiment example, at least one row of serially arranged optically transparent sections may be formed in the storage body. Such a row of holes may be arranged along a direction of the storage body, which may correspond to an extension direction and/or an alignment of the sensor rail. This direction may in turn coincide with a depth of the storage body, if the latter is mounted to the mounting structures of the storage device. If storage goods of a particular type (for example storage boxes, which are filled with a particular type of screws) are arranged and/or layered along the extension of such a row of holes in order to be withdrawn from there one after the other by a user, then the detection of a position of a hole along the row of holes, at which position the detection signal changes, may be identified as the position, up to which remaining storage goods may still be present.

It is particularly preferred if a storage body has plural, mutually parallel rows of serially arranged optically transparent sections. It may then be possible for example to assign to the individual rows of holes plural different types of storage goods. A detection signal of the sensor elements along one of these rows of holes may then be uniquely associated to a remaining stock of inventory of a type of storage good that may be associated to this row of holes and associated sensor rail.

According to an embodiment example, the storage insert may have at least one further optically transparent section between the receiving region and the top side, and at least one further sensor rail, which may be formed to be received in the receiving region by the receiving structures and which may have at least one further sensor element in the region of the at least one further optically transparent section. In other words, plural sensor rails and associated holes or rows of holes may be associated to a (or one) storage body.

According to an embodiment example, the sensor rail may be rigid. If the sensor rail is manufactured from a rigid material, then after the inserting thereof into the receiving structures of the storage body, a fixed and clearly defined position of a respective sensor element at this sensor rail in relation to a respective optically transparent section in the receiving region may be ensured. Then, an error-robust mounting of the sensor rail to the lower side of the storage body may be guaranteed.

According to an embodiment example, the sensor rail may be formed as a printed circuit board (i.e. as a PCB, printed circuit board), which may have electrically conductive structures, wherein the at least one sensor element may be mounted on and/or in the circuit board and may be electrically coupled to the electrically conductive structures. Such a circuit board, which may be manufactured for example from a cured resin having reinforcing glass fibres (further in particular FR4 material), may form a rigid supporting body for the mounting of sensor elements at a surface and/or at least partially embedded in an interior of the circuit board. Thereby, a fixed specification of a relative position between the sensor elements and the optically transparent sections of the storage body in an inserted state of the circuit board may be ensured. At the same time, electrically conductive structures (in particular copper paths) may be formed on and/or in the circuit board, which structures may effect a supply with electric energy to the at least one sensor element as well as the transport of electric sensor signals. Thereby, a high sensoric quality, an electrical coupleability (or ability to be coupled) and a cost-efficient manufacture of the sensor rail may be combined.

According to an embodiment example, a plug connector may be conceived at the sensor rail as an electric interface for the transport of electrical signals to or from the at least one sensor element and/or electric supply energy to the at least one sensor element. The plug connector may be configured for connecting to a plug of a connector cable, which may be guided along the storage body (for example in a cable channel). The plug connector may be coupled to the electrically conductive structures of the sensor rail that may be formed as a circuit board. If the plug connector is coupled at the end of the sensor rail to a corresponding plug element for connecting to an electric supply voltage and/or to an acceptor of sensor signals of the at least one sensor element of the sensor rail, an electric signal and supply path may be formed by simple means.

According to an embodiment example, the at least one sensor element may have an emitter element for emitting electromagnetic primary radiation and a detector element for detecting electromagnetic secondary radiation in reaction to an emitting of electromagnetic primary radiation. This cooperation of emitter and detector may be dependent in a characteristic manner from whether the at least one optically transparent section on the top side is covered with storage goods or not. For example, such an emitter element may be a light-emitting diode, which may emit electromagnetic radiation (in particular light) in a prescribable range of wavelengths and/or at a predefined wavelength. This electromagnetic radiation may penetrate through the optically transparent section, and may then be reflected at least partially at a storage good and/or a storage box which may have such storage goods only, if such storage good is stored at the position of the optically transparent section. The reflected electromagnetic secondary radiation may then be detected by the detector element (for example a photodiode) at the sensor rail. If, on the other hand, no storage good is present at the position of the optically transparent section (for example because a stock of inventory has reduced accordingly), the electromagnetic primary radiation may not be reflected there at the storage good or at an associated storage box. This may result, at the position of the detector element, to a different detection signal as compared to the scenario described before. Thus, the state of filling of the storage body along a sensor rail may be determined with high precision and error-robustly on the basis of the detection signal.

According to an embodiment example, a cable channel may be formed at the storage body. In particular, a cable channel may be formed at an end section of the storage body facing away from a user (in a state of the storage insert being mounted to mounting structures of a storing device). Electrical cables may be guided in this cable channel, which cables may be electrically coupled to the plug connector of the sensor rail for transmitting sensor data and/or for providing an electric supply voltage. Such a cable channel may be formed for example by bending an outer edge of the storage body (for example to a C-profile or to a step-profile) with little effort and decoupled from the storage region.

According to an embodiment example, the at least one storage insert may be attached to the attachment structures such that the top side of the storage body may be inclined with respect to a horizontal, in particular, an associated storage area may incline slopingly towards a user. According to such a preferred embodiment example, the storage body may have, in the state mounted to the mounting structures, an inclination with respect to the horizontal, such that storage goods stored on the surface of the storage body may slide along the inclination down to an (in particular user-sided) end of the storage insert by the gravitational force. For example, the inclination angle may be in a range between 2° and 45°, in particular in a range between 5° and 30°. The inclination angle may be selected such that the component of the gravitational force of the storage goods that may result in a sliding down may be greater than a frictional force of the storage goods at the top side of the storage body. Thereby, it may be particularly preferred that the storage body is inclined slopingly towards a user position in front of the storage device. Thereby, the storage goods may always slide towards the user, which may enable a simple withdrawal of the storage goods. At the same time, it may be ensured by the provision of such an inclination, that a row of optically transparent sections may be free from storage goods according to a degree of filling of an associated storage volume down to a particular location of storage goods and may only then be covered with storage goods. The sensor signals of the sensor elements thus may change characteristically or step-wisely at the transition, such that a remaining filling with associated storage goods may be determined precisely and quantitatively on the basis of the sensor elements.

According to an embodiment example, a cable channel may be formed at and/or in the mounting structures, in particular connected to a cable channel at the at least one storage insert. The electric cables may thus run initially horizontally along a respective storage insert up to the mounting structures and starting from there vertically at and/or in the latter. Preferably, the cable channel (and the associated cables) may be inaccessible from the outside also at the interface between the mounting structures and the storage insert. All cables of all storage inserts of a storage device may thus be guided along the mounting structures up to one single common electronic interface of the storage device to other storage devices or to the management device of the storage management system.

According to an embodiment example, the mounting structures preferably may have vertical mounting rods. The mounting rods may be formed with a rectangular profile. The latter may in turn be formed from two corresponding L- or angle-profiles. Mounting rods may be a particularly stable and cost-efficient embodiment of the mounting structures. They further may be suitable, due to their geometry, to receive in their interior electric cables for providing an electric energy supply of the sensor rail and/or for a transport of sensor signals. Particularly preferable may be the realization of a mounting rod having a rectangular profile, which may be manufactured by the connection of two L- or angle-profiles. A cable channel can may be formed between two such L- or angle-profiles. Of these two L- or angle-profiles, one may be configured for carrying a load of the storage device, and the other one may be joined for example as a cover without a significant contribution for carrying loads to the load-carrying L- or angle-elements.

According to an embodiment example, the at least one storage insert may be equipped at least partially with storage goods, in particular in the form of goods containers, storage boxes and/or bulk goods. By the sensor elements, a remaining filling state for each of these storage goods may be measured sensorically.

According to an embodiment example, the management unit may assign a specific storage good to each optically transparent section in each receiving region and each associated sensor element of a sensor rail of a respectively associated storage insert of a respective storage device, and manage the respective specific storage good dependent on sensor signals of the associated sensor element. In particular, the management device may trigger or perform a re-order of the respective specific storage good on request. Thus, if a sensor rail transmits a sensor signal to the management device, which signal may contain an identifier of this sensor rail, the management device may determine only on the basis of the sensor signal and the associated identifier, which remaining quantity of an associated type of storage good is present at the corresponding position. If this remaining quantity falls below a particular threshold value, the management device may trigger or perform a re-order of specifically this type of storage good in a quantity that may be dependent from the sensorically registered remaining quantity.

According to an embodiment example, the management device may be coupled electrically to the sensor rails of the at least one storage insert of the storage devices by cable connections. The coupling of the management device to the sensor rails may thus be effected wire-connectedly (or wire-bound), which is advantageous in particular for providing electric supply energy. Alternatively, a wireless coupling may also be possible. In the latter case, the effort in relation with cable connections may be omitted.

According to an embodiment example, the storage management system may have a control center (which may be embodied as a processor), which may be coupled capably to communicate (in particular coupled capably to communicate wirelessly) to a plurality of management devices (which may be associated to different storage devices or groups of storage devices) for controlling a stock of inventory. The control center may for example be the logistics center of an enterprise (or organization), which center organizes a subsequent supply (or additional delivery) of re-ordered storage goods. Because the control center may often be located at a totally different position as compared to the management device, a wireless communication, which may simply be possible also over larger distances, between the control center and the management device may be advantageous. Such a communication may be effected for example via a communications network, for example the public Internet or a telecommunications network.

BRIEF DESCRIPTION OF THE DRAWINGS

FIG. 7A shows a side view, FIG. 7B shows a front view.

FIG. 10A shows a side view, FIG. 10B shows a front view.

DETAILED DESCRIPTION OF ILLUSTRATED EMBODIMENTS

Same or similar components in different figures are provided with the same reference numerals.

In the following, example embodiments of the present storage shelf are described in detail with reference to the following figures.

Before exemplary embodiment examples are described with reference to the figures, some basic considerations shall be summarized, on the basis of which exemplary embodiment examples of the invention have been derived.

The arrangement and the attachment (or mounting) of sensor elements at a storage body (for example a rack shelf) may conventionally be associated with difficulties. On the other hand, the sensor elements may have to be positioned accurately, because otherwise they may measure nothing or do not measure the right thing. On the other hand, a frequent requirement may be that the sensor elements may not have to reach substantially into the space, in order to avoid a damage of the sensor elements and in order to not restrict the space that is available for storage goods. Furthermore, such sensor elements may have to be encapsulated, in order to protect them from dust, liquid, etc. and to enable an easy cleaning thereof. Since storage devices (such as for example racks) may find application in broad areas of application, variations in temperature and humidity may not have to result in malfunctions.

Against this background, an easy and secure mounting of sensor elements to a storage body may be necessary, with simple exchangeability and favourable (or low priced) manufacture of the sensor elements, which beyond that may have to be suitable for a broad temperature and humidity range.

In the following, exemplary embodiment examples of the invention are described, which satisfy these requirements.

Figures 1, 2:
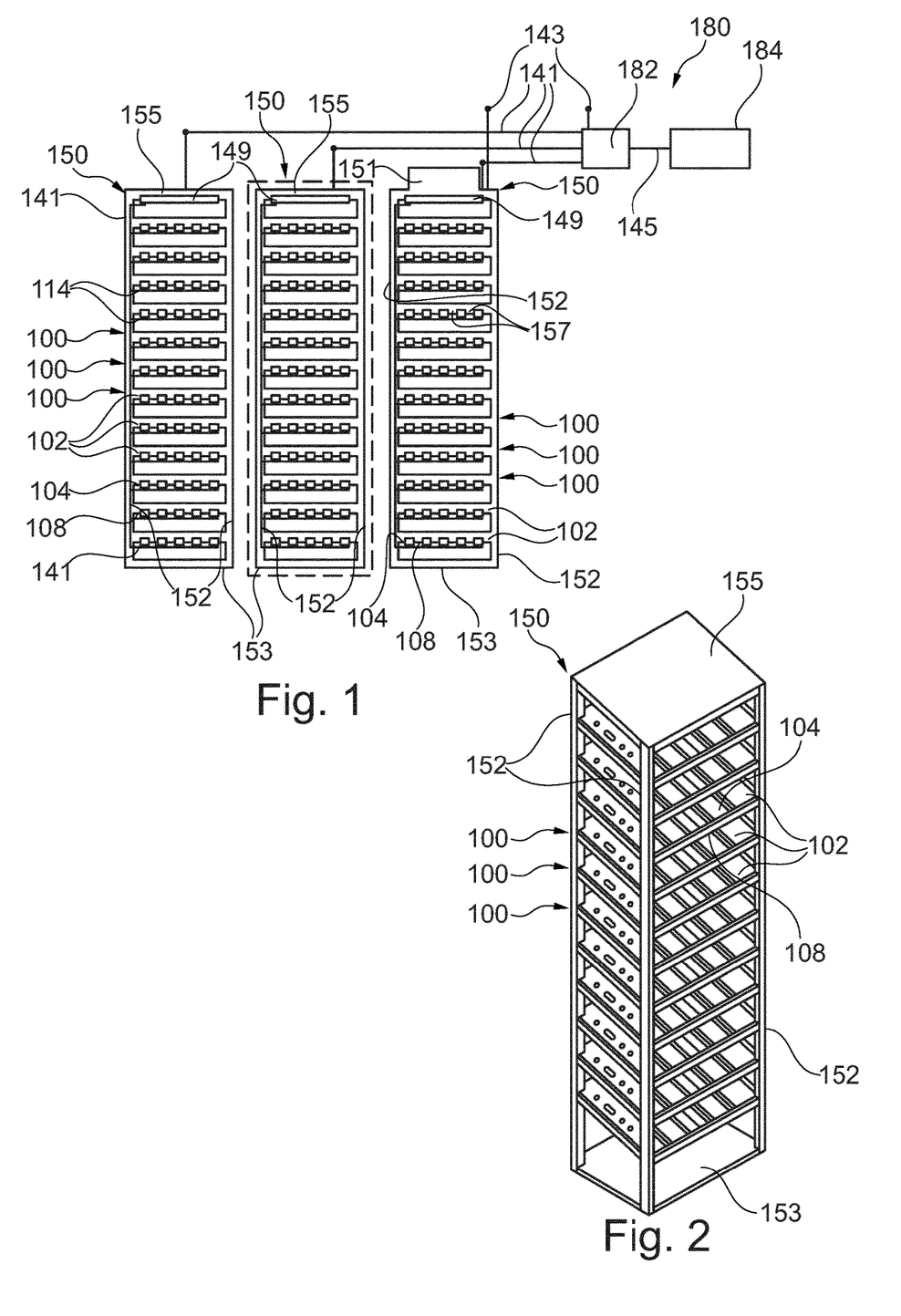
FIG. 1 shows a storage management system having plural storage devices, each of which has plural storage inserts according to an exemplary embodiment example of the invention.
FIG. 2 shows a storage device of the storage management system according to FIG. 1.
Figure 3:
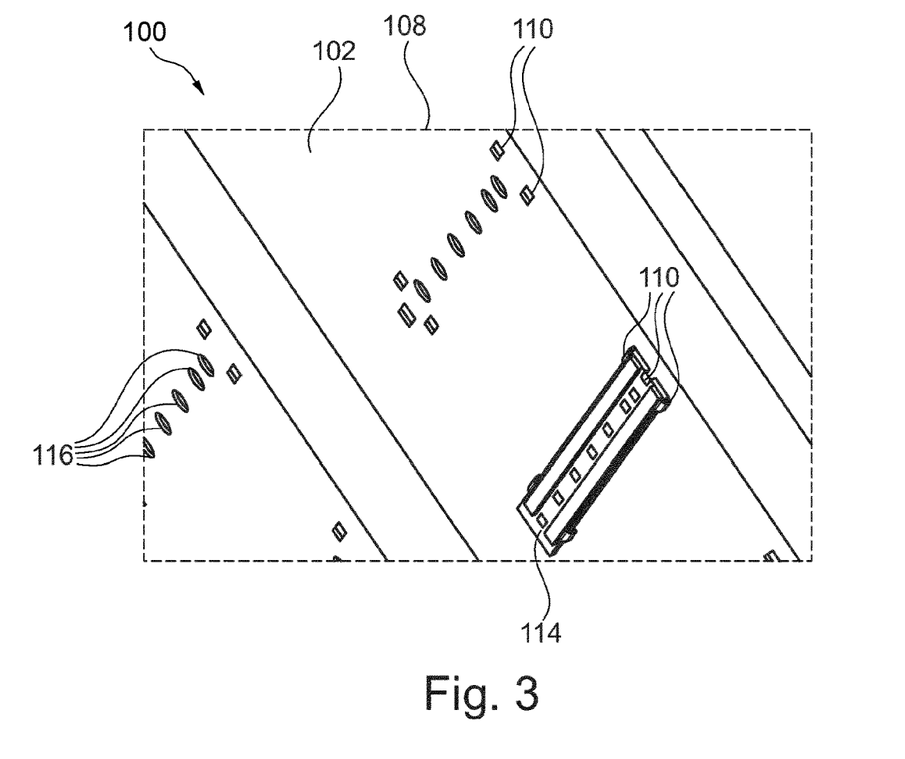
FIG. 3 shows a detail of a lower side of a storage insert of a storage device according to FIG. 2.
Figure 4:
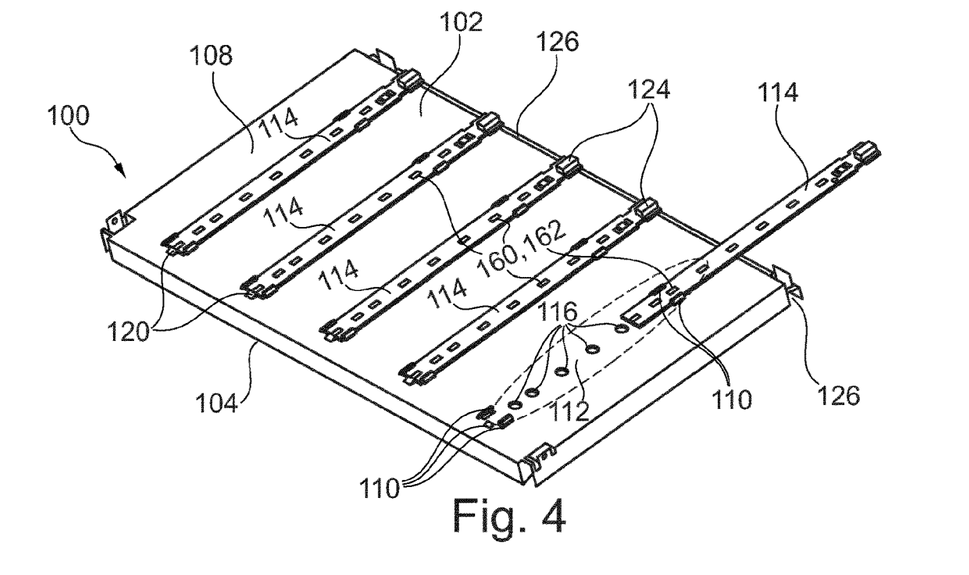
FIG. 4 shows the whole underside of a storage insert of a storage device according to FIG. 2.
Figure 5:
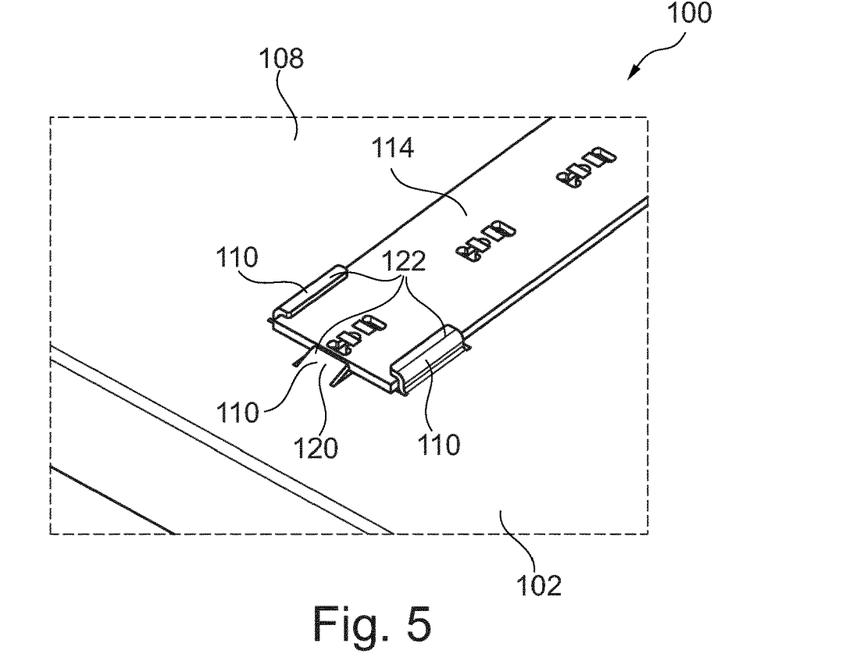
FIG. 5 shows a still further magnified detail of a lower side of a storage insert of a storage device according to FIG. 2.
Figure 6:
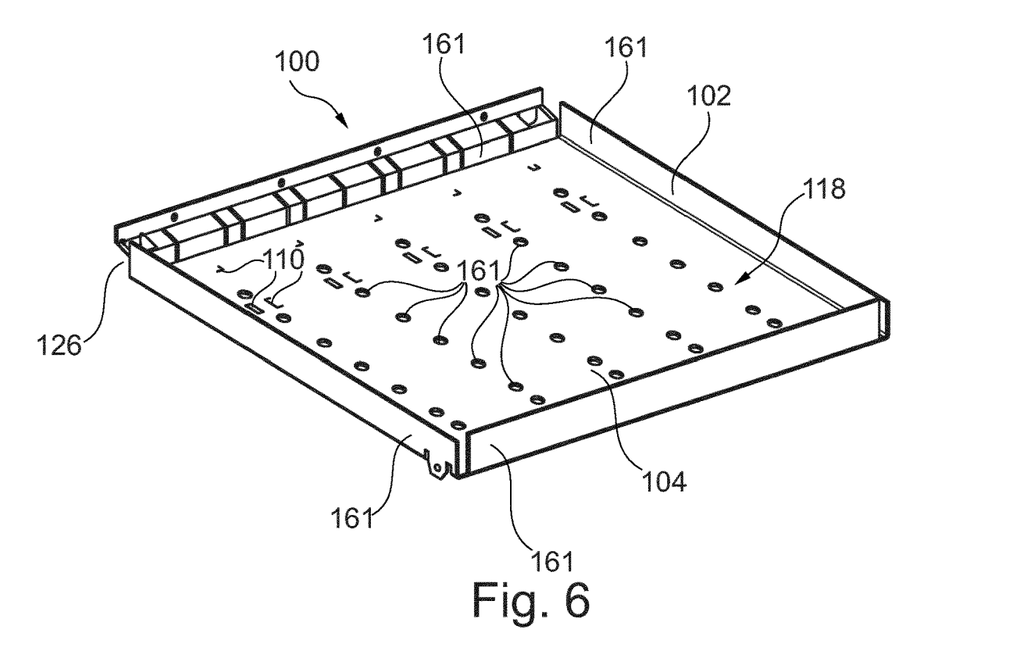
FIG. 6 shows the whole top side of a storage insert of a storage device according to FIG. 2.

FIG. 1 shows a storage management system 180 having plural storage devices 150, each of which has plural storage inserts 100 according to an exemplary embodiment example of the invention. FIG. 2 shows a storage device 150 of the storage management system 180 according to FIG. 1. FIG. 3 shows a detail of a lower side 108 of a storage insert 100 of the storage device 150 according to FIG. 2. FIG. 4 shows the whole underside 108 of the storage insert 100 of the storage device 150 according to FIG. 2. FIG. 5 shows a still further magnified detail of the lower side 108 of the storage insert 100 of the storage device 150 according to FIG. 2. FIG. 6 shows the whole top side 104 of the storage insert 100 of the storage device 150 according to FIG. 2.

With reference to FIG. 1, there may thus be established a storage management system 180, which may have, in the illustrated embodiment example, three storage devices 150 in the form of storage racks or storage towers. A management device 182 that may be embodied as a processor may be coupled to sensor elements at sensor rails 114 of the storage inserts 100 via electrical connection cables 141, and may be configured to manage a respective stock of inventory of respective storage goods (not represented in FIG. 1 to FIG. 6, compare for example reference numeral 106 in FIG. 7A and/or FIG. 7B) on a respective one of the storage inserts 100, based on sensor signals of the sensor elements of the storage inserts 100. For this purpose, the management device 182 may associate a specific storage good 106 to each optically transparent section 116 in each receiving region 112 and each associated sensor element of a sensor rail 114 of a respectively associated storage insert 100 of a respective storage device 150—compare FIG. 4 and FIG. 6. Dependent on sensor signals of the associated sensor elements, the management device 182 may then manage the respective specific storage good 106. For example, a re-order of the respective specific storage good 106 may be performed or triggered by the management device 182 on request. As has been discussed already, the management device 182 may be electrically coupled by cable connections (see reference numeral 141) to the sensor rails 114 of all storage inserts 100 of all storage devices 150. Via the cables 141, electric energy, which may be provided by an electric energy supply 143, may be transmitted for supply of the sensor elements.

A control center 184, which may be external with respect to the warehouse, in which the storage devices 150 and the management device 182 may be arranged, may be coupled wirelessly capably to communicate to the management device 182 (and optionally also to other management devices of other warehouses, which are not illustrated in FIG. 1) for controlling a stock of inventory. Dependent on the sensorically registered remainders of stock of the storage goods 106 on the respective storage inserts 100, the management device 182 may transmit a communications message to the external control center 184 via a wireless communications connection 145, by which communications message a re-order of the storage goods 106 may be triggered at the control center 184. The control center 184 may have for example a processor and a router as well as an electric energy supply.

As is further illustrated in FIG. 1 and also in FIG. 2, each one of the three storage devices 150 may have four mounting structures 152, respectively, for attaching (or mounting) the associated storage inserts 100 at different levels of height. In other words, the storage inserts 100 may be fixed and/or mounted to the mounting structures 152 on top of each other. The mounting structures 152 may be embodied as vertical mounting rods having a rectangular profile, and may be formed for example by two L-profiles and/or angular profiles mounted to each other. One vertical cable channel 126, in which cables 141 may be guided, may run respectively in the interior of the mounting structures 152. Furthermore, the vertical cable channel 126 may be connected at each one of the storage inserts 100 to respective horizontal cable channels 126, in order to thereby enable a continuous cable guiding from the sensor elements to the management device 182 and/or to the energy supply 143.

As can also be recognized in FIG. 1, a master device 149 may be provided at a respective top side of each storage device 150, which master device may be configured for collecting and/or (pre-) processing the detection signals of the sensor elements of their associated storage inserts 100 and for providing an energy supply of the sensor elements of the associated storage inserts 100. A cover 151 may further be attached at a top side of a respective storage device 100. It may also be possible to equip a respective storage device 150 with a bottom plate 153 and/or a cover plate 155. Furthermore, it may be possible, as is illustrated in FIG. 1, to delimit different compartments or storage regions of a storage insert 100 by a separator 157, i.e. a mechanical separation element. Thereby, separate compartments for receiving different storage goods 106 may be separated.

In the following, the composition (or structure) of the storage inserts 100 is described in more detail with reference to FIG. 3 to FIG. 6.

Each one of the storage inserts 100 may have a planar storage body 102 (a rack shelf at hand), which may be embodied production-oriented simply as a bent and punched sheet plate. A top side 104 of the storage body 102, which may be directed upwardly for an intended use of the storage insert 100 according to FIG. 1 or FIG. 2, may serve as a storage surface for receiving storage goods 106. As can be recognized in FIG. 6, a receiving volume 118, which may be spatially recessed with respect to lateral (and for example at least section-wise vertical) delimitation walls 161, and which may be for receiving the storage good 106, may be delimited at the top side 104 of the storage body 102.

A lower side 108 of the storage insert 100, which may be opposite to the top side 104 and which may be directed downwardly for an intended use of the storage insert 100 according to FIG. 1 or FIG. 2, may be provided with receiving structures 110 for receiving a respective sensor rail 114 in each one of receiving regions 112 that are arranged side by side. The receiving structures 110 may have guiding noses, which may extend downwardly from the lower side 108, and which may serve for a drawer-type pushing in or pulling out of the sensor rail 114. These guiding noses may support the sensor rail 114 at their two long sides opposing each other, at plural positions. Furthermore, the receiving structures 110 may have a mechanical stop 120 for defining an end position of the received sensor rail 114. If the sensor rail 114 is pushed in along a longitudinal direction into a receiving region 112, the guiding noses may support the sensor rail 114 laterally. If the sensor rail 114 has reached its targeted end position in the longitudinal direction, i.e. in the pushing in direction, the front short side thereof may strike against the mechanical stop 120, which thereby may limit an undesired further pushing in of the sensor rail 114 and/or may make it impossible. As can best be recognized in FIG. 5, all receiving structures 110 may be carved out from the storage body 102 as L-shaped and/or V-shaped notches 122. For this purpose, lugs (or flaps) in the sheet plate may be delimited by forming cuts, and may be bent out of the extension plane of the sheet plate under formation of the L-shaped and/or V-shaped notches 122.

Rows of holes in each one of the receiving regions 112 may form optically transparent sections 116, and may be embodied as through-borings between the receiving region 112 and the top side 104, which through-borings may extend vertically through the planar storage body 102. Each row of holes may be spatially associated to a respective sensor rail 114 and may contain a sequence of through-borings through the storage body 102, which through-borings may be spaced at a distance from each other and arranged linearly. Thus, the optically transparent sections 116 may be embodied as through-borings in the storage body 102. The through-borings may be formed such that thereby plural rows, arranged parallel to each other, of serially arranged optically transparent sections 116 may be formed in the storage body 102, and namely one row per inserted or insertable sensor rail 114.

One respective rigid sensor rail 114 may be associated to each one of the plural receiving regions 112, which may be arranged side by side and which are defined by a respective row of optically transparent sections 116 and spatially associated receiving structures 110. In order to mount a sensor rail 114 to a receiving region 112, the sensor rail 114 may be inserted by a user in a drawer type manner, in order to be received in a spatially precisely defined manner in the respective receiving region 112 by associated receiving structures 110. Each one of the sensor rails 114 may have a sequence and/or row of optical sensor elements, which may come to a contact (or abutment) at a respective one of the serially arranged optically transparent sections 116 upon pushing in of the sensor rail 114 up to reaching the mechanical stop 120. Stated differently, each one of the sensor elements of the sensor rail 114 may be located precisely underneath a respective optically transparent section 116, when the sensor rail 114, as defined by the receiving structures 110, may have asserted its target position in the associated receiving region 112. In this target position, a faultless (or proper) cooperation of these sensor elements with the optically transparent sections 116 may be ensured for detecting storage goods 106.

Figures 8A, 8B:
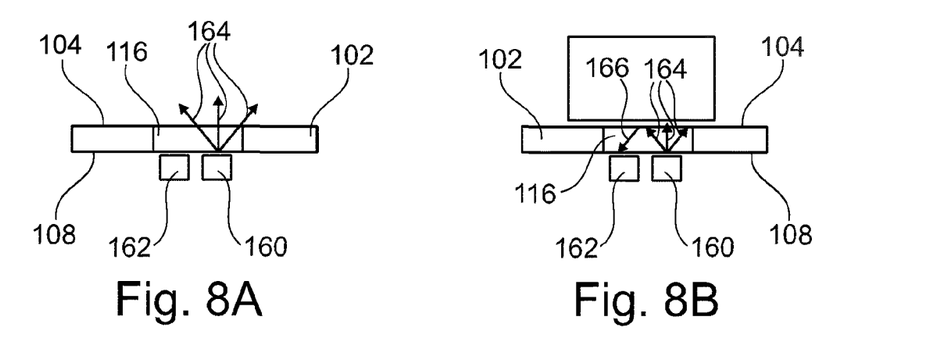
FIG. 8A shows a sensor element of a storage insert according to an exemplary embodiment example of the invention in an operational state, in which no storage good is stored in an associated region of the storage surface of the storage insert.
FIG. 8B shows the sensor element according to FIG. 8A in an operational state, in which storage good is stored in the associated region of the storage surface of the storage insert.

As can be recognized in FIG. 4 and is shown closer in FIG. 8A and FIG. 8B, each sensor element may have for example an emitter element 160 for emitting electromagnetic primary radiation 164, and a detector element 162 for detecting electromagnetic secondary radiation 166 in reaction to an emitting of electromagnetic primary radiation 164. The electromagnetic primary radiation 164 and/or the electromagnetic secondary radiation 166 may propagate through the optically transparent section 116. Reflected electromagnetic secondary radiation 166 may be detected by the detector element 162 in an appreciable intensity only then, when the optically transparent section 116 is covered by storage good 106.

By the optical sensor elements being located directly underneath the respective optically transparent sections 116 of the storage body 102, the optical sensor elements may optically distinguish the two states, in which storage good 106 may be located on the associated optically transparent section 116 or not. If storage good 106 is located on the associated optically transparent section 116, the storage good may close the optically transparent section 116. If no storage good 106 is located on the associated optically transparent section 116, the optically transparent section 116 may remain open. The optical detection signals of the sensor elements thus may allow the conclusion as to whether storage good 106 may be located directly above the respective sensor element or not.

With advantage may each one of the sensor rails 114 be embodied as a printed circuit board (i.e. as a PCB), which may have a dielectric base body of FR4 material and electrically conductive structures formed thereon and/or therein in the form of copper paths, copper vias, etc. The sensor elements may be surface-mounted on the circuit board and may be electrically coupled to the electrically conductive structures. Thereby it may be ensured that the circuit board may not only serve as a mechanical supporting structure and/or mounting base for the sensor elements, but at the same time may form an electric connection of the sensor elements with an electric supply voltage as well as with the signal line for transmitting detected sensor signals. At the same time, the circuit board may support the sensors under the sections 116. Further, the sensor rail 114 may be provided at an end with an electric plug connector 124, which may be electrically coupled to the electrically conductive structures of the circuit board. The plug connector 124 may serve for plugging in a corresponding electric plug element (not shown) at an end of the cable 141 and for the transport of electrical signals and electrical supply energy between the sensor elements of the sensor rail 114 and the cables 141. A cable channel 126 for receiving the cables 141 may be formed at an end section of the storage body 102, which may, in operation, be facing away from a user.

The sensor elements may be arranged on the circuit board of the sensor rail 114. This circuit board may have, beside the sensor elements, as the case may be also an electronic circuitry for controlling the sensor elements and for transmitting the measurement results. The sensor elements may be arranged on the circuit board at the locations, at which the plate-type storage body 102 may have the openings as optically transparent sections 116. Thereby, the sensor elements may be optically coupled through the whole storage body 102 to the top side 104 for receiving storage goods 106. By the stiffness of the sensor rail 114, the sensor elements may be arranged in a fixed distance to each other and may be handled easily. By the integration of the sensor elements in the circuit board, the measurement device for the presence of storage goods 106 in the associated storage device 150 may be manufactured easily and cost-efficiently in the form of the sensor rail 114. The measurement device, which may be embodied as a sensor rail 114, may simply be arranged as a whole at the storage body 102 and may thus be exchanged by an easy pulling out and re-inserting thereinto. Thereby, mounting and repair times at the storage device 150 may be held low or even minimized. The sensor elements may preferably be encapsulated in the sensor rail, such that they may be easily freed from dust, etc.

The storage device 150 may have vertically extending rods as mounting structures 152 as well as storage inserts 100, arranged therebetween, as rack shelves, which may run inclined for example horizontally or slightly inclined with respect to a horizontal line. The sides of the storage inserts may be inclined towards the operation side of the storage device 150, which is here embodied as a rack, such that storage good 106, which may be arranged on the top side 104 of the storage body 102 may slide towards the front side and/or in the direction of the user of the storing device 150 due to the gravitational force. Each storage body 102 may have rows of holes as optically transparent sections 116, which may run from the operation side thereof in the direction to its back side, and which may be arranged parallel to each other. In the represented embodiment, for example, five rows of holes may be implemented in a storage body 102. Storage boxes (see FIG. 7A) with storage goods 106 (for example screws or bolts) may be arranged on, or storage goods 106 may directly be arranged on, upper surfaces 104 of the storage body 102, which upper surfaces may form rack shelves. One row of equal storage boxes (for example cardboards) and/or storage goods 106 may be arranged one after another (in particular from the operating side in the direction towards the back side) on each row of holes.

Each row of holes may have the notches (for example L-shaped) protruding downwardly as receiving structures 110, wherein the distance of the notches may correspond to the width of the sensor rail 114. A sensor rail 114 that may be formed by a circuit board may be pushed in a drawer-like manner in these notches from the back side of the storage device 150 that is here of a rack type, wherein the sensor rail 114 may be pushed in only up to a mechanical stop 120 that may also be formed by a notch. If the sensor rail 114 is pushed in correctly (i.e. up to reaching the mechanical stop 120) into this drawer structure that may be formed by simple means, the sensor elements of the sensor rail 114 may be arranged precisely underneath the optically transparent sections 116 of the respective row of holes. The sensor rail 114 may have, at its free end, a plug-in coupling and/or a plug connector 124. The sensor rail 114 (stated more precisely, the sensor elements thereof) may be connected to an electronic circuitry of an inventory control system by the plug connector 124. This electronic circuitry may control the sensor elements and receive and/or process signals from the sensor elements and/or may provide a current supply.

If the storage devices 150, which are here formed as towers, may be arranged side by side, then it may be advantageous to guide cables 141 from one tower-type storage device 150 to another tower-type storage device 150. The cables 141 may, with advantage, be guided in a cable channel 126, without thereby protruding out of the cable channel 126. On the other hand, a respective cable may have to be guided in a simple manner from one storage device 150 to another one. For this purpose, the cable channel 126 of each storage device 150 may have a lateral boundary to the cable channel 126 of the neighbouring storage device 150. In the latter one (or in the boundary), there may for example be formed a perforated section, which may be easily pushed out preferably without a tool, in order to provide an opening to the cable channel 126 of the next and/or neighbouring storage device 150. However, the provision of cable channels 126 may be optional.

In this embodiment example, the mounting structures 152 of the storage devices 150, which may be embodied as rack rods in the illustrated embodiment example, may be formed with a rectangular profile. A further rectangular profile may be joined for forming a vertical cable channel 126, which profile may be in connection with a mounting structure 152 and with one or plural storage inserts 100 (for example rack shelves), whereby a hollow pipe having a rectangular cross-section may be formed. A cable channel 126, which may be vertical and rectangular in cross-section, and in which the cables 141 that may come from the sensor rail 114 may be guided, may be formed thereby. The profile of the cable channel may have notches for the storage inserts 100 that are here formed as rack shelves. The storage inserts 100 may have a stop angle (or stopper edge) at their back side. The profiles of the cable channels may have an undercut running vertically. This undercut may be formed such that the undercut can engage in the edge of the storage body 102 from the upper side, whereby the profile may be supported reliably and safely.

Similar to the profile of the cable channel for the mounting structures 152 described above, a profile may be formed at the back side of the storage body 102, which profile may be plugged to the rear edge of the storage body 102, in order to form a horizontal cable channel 126. In this horizontal cable channel 126, the cables 141 from the individual circuit boards and/or sensor rails 114 may be guided in a bundled manner. This may be effected up to the respective vertical cable channel 126, which may be guided at the mounting structure 152 that may be embodied here as a rack rod.

The cables 141 of the individual sensor rails 114 may be guided from a respective storage body 102 to the vertical cable channel 126 of a mounting structure 152. The cables, which may arrive at the vertical cable channel 126, may be guided to a horizontal shelf (or bottom), which may lie on the four mounting structures 152 of the storage device 150. For example, a data logger with a router for connection to a stock management system may be arranged on this storage body 102. However, it may also be possible that the cables 141 of a storage device 150 may be guided further to a neighbouring storage device 150, on which a data logger with a router may then be located.

Figures 7A, 7B:
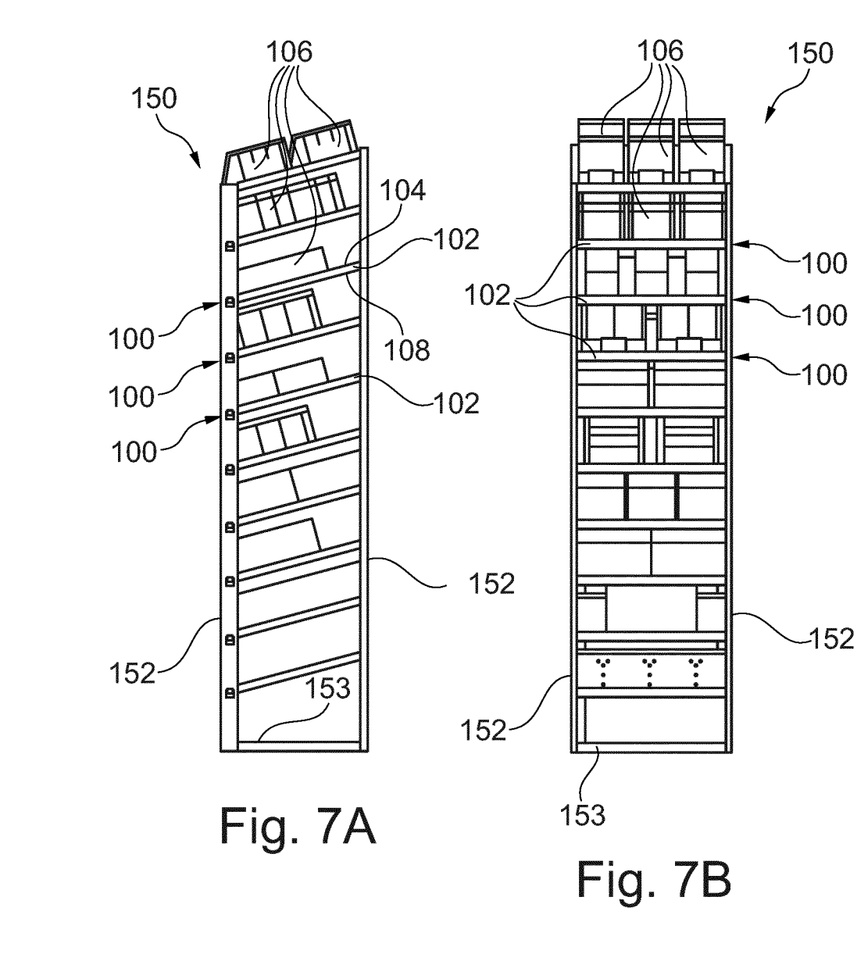
Figure 7C:
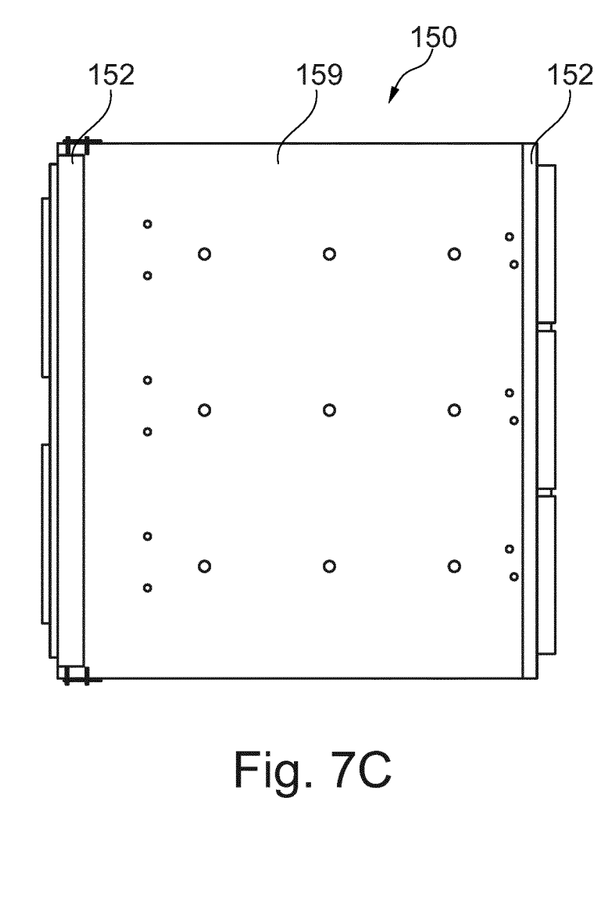
FIG. 7C shows a rear view of a storage device according to a further exemplary embodiment example of the invention.

FIG. 7A shows a side view, FIG. 7B shows a front view, and FIG. 7C shows a rear view of a storage device 150 according to a further exemplary embodiment example of the invention.

It can be taken from FIG. 7A that the storage inserts 100 may be attached to the mounting structures 152, such that their top sides 104 may be inclined with respect to the horizontal, sloping towards a user. Thereby, as is also shown in FIG. 7A, the storage goods 106 and/or the storage boxes may slide towards a user. For partially filled storage inserts 100, optically transparent sections 116 in a rear region of the storage inserts 100 may thus be free from storage goods 106, whereas the optically transparent sections 116 in a front region of the storage inserts 100 may be covered by storage goods 106. This clearly defined transition may facilitate the sensorical determination of the degree of filling of a storage insert 100 with storage goods 106.

It can be seen in FIG. 7C that the lateral surfaces of the storage device 150 between respective mounting structures 152 may be covered with a sidewall 159.

FIG. 8A shows a sensor element of a storage insert 100 according to an exemplary embodiment example of the invention in an operational state, in which no storage good 104 is stored in an associated storage surface region of the storage insert 100, i.e. above the optically transparent section 116. FIG. 8B shows the sensor element according to FIG. 8A in an operational state, in which storage goods 106 and/or a storage box with storage goods 106 is stored in the associated storage surface region of the storage insert 100, i.e. above the optically transparent section 116.

As is shown in FIG. 8A and FIG. 8B, the sensor element may have an emitter element 160 for emitting electromagnet primary radiation 164, and a detector element 162 for detecting electromagnetic secondary radiation 166 in reaction to an emitting and reflecting of electromagnetic primary radiation 164. The emitter element 160 may for example be a light emitting diode. The detector element 162 may for example be a photodiode. Dependent on whether the at least one optically transparent section 116 is covered by storage goods 106 on the top side 104 or not, the reflection behaviour and thus a detection signal, which may be registered by the detector element 162, may change.

If, as is illustrated in FIG. 8A, no storage goods 106 may cover the optically transparent section 116, the emitted electromagnetic primary radiation 164 is not reflected at the storage goods 106. Electromagnetic secondary radiation 166, which may result from the emitted electromagnetic primary radiation 164, may thus not be detected in the detector element 162 in the scenario according to FIG. 8A.

If, on the other hand, as is illustrated in FIG. 8B, storage goods 106 may cover the optically transparent section 116, the emitted electromagnetic primary radiation 164 may be reflected at the storage goods 106. As a result, electromagnetic secondary radiation 166, which may be reflected in reaction to the emitting of the electromagnetic primary radiation 164, may impinge on the detector element 162 and may be detected there.

Consequently, a filling state of the storage insert 100 may be determined sensorically with the illustrated configuration.

Figure 9:
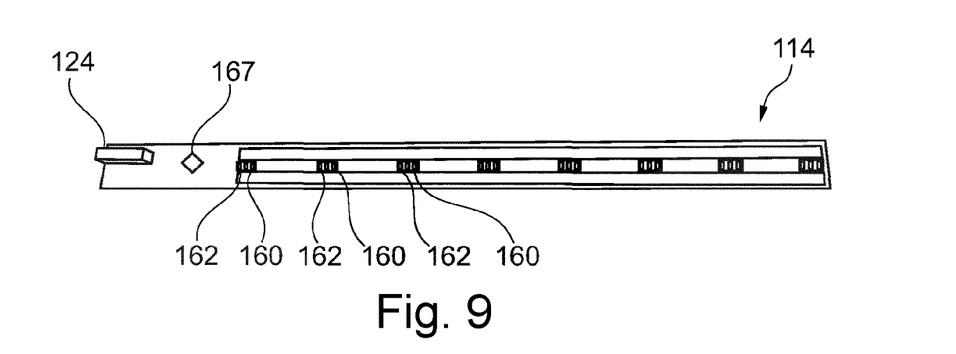
FIG. 9 shows a sensor rail of a storage insert according to an embodiment example of the invention, which rail has been manufactured in circuit board technology.

FIG. 9 shows a sensor rail 114 of a storage insert 100 according to an embodiment example of the invention.

The sensor rail 114 illustrated in FIG. 9, which may have a length-to-width-ratio of above ten (more generally of at least five), may be embodied as a printed circuit board, to which the emitter elements 160 and the detector elements 162 may be surface-mounted. Electrically conductive structures of the circuit board, which are not illustrated in detail in FIG. 9, may couple the emitter elements 160 and the detector elements 162 to a control chip 167 and to a plug connector 124.

Figure 10A:
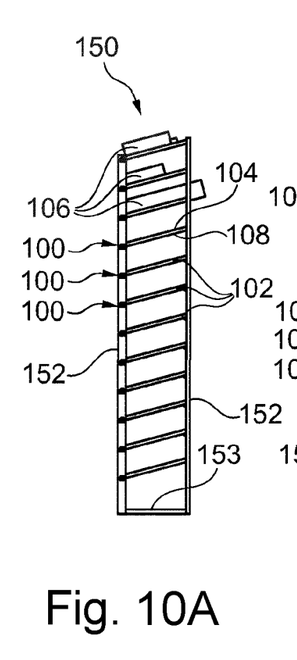
Figure 10B:
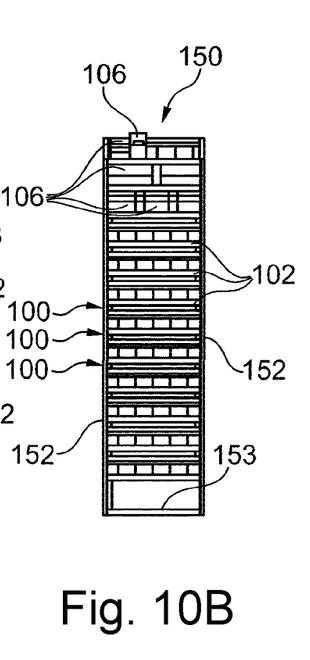
Figure 10C:
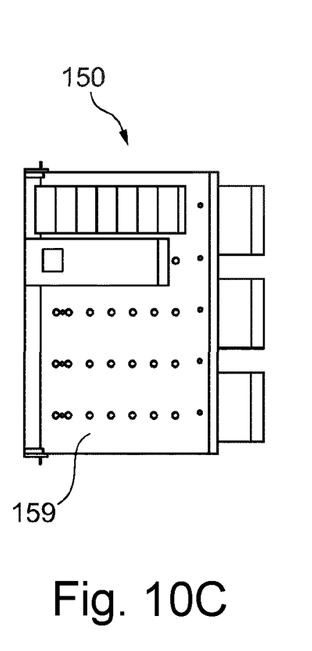
FIG. 10C shows a rear view of a storage device according to a further exemplary embodiment example of the invention.

FIG. 10A shows a side view, FIG. 10B shows a front view, and FIG. 10C shows a rear view of a storage device 150 according to a further exemplary embodiment example of the invention. With regard to the features of this embodiment example, reference is made essentially to the description relating to FIG. 7A to FIG. 7C. While according to FIG. 7A to FIG. 7C, the storage boxes for receiving the storage goods 106 may be plastic boxes, the storage boxes for receiving storage goods 106 according to FIG. 10A to FIG. 10C may be paper or cardboard containers. As is represented in FIG. 10C, the sidewall 159 may also be embodied partially open.

Supplementarily, it is to be noted that "having" does not exclude other elements or steps, and that the article "a" or "an" does not exclude a plurality. Furthermore, it is to be noted that features or steps, which have been described with reference to one of the embodiment examples above, may also be used in combination with other features or steps of other embodiment examples described above.

The invention claimed is:

1. A storage insert, comprising:
    a storage body having:
        an upper side for receiving storage goods;
        a lower side having receiving structures in a receiving region for receiving a sensor rail; and
        at least one optically transparent section between the receiving region and the upper side;
        wherein the sensor rail is configured to be received in the receiving region by the receiving structures and has at least one sensor element in the region of the at least one optically transparent section;
        wherein the receiving structures are formed for a drawer-type sliding-in or pulling out of the sensor rail;
        wherein the receiving structures have a mechanical stop for defining an end position of the received sensor rail; and
        wherein the storage body including the receiving structures and the mechanical stop is formed integrally as one piece and one material.

2. The storage insert according to claim 1, wherein a receiving volume for receiving the storage goods is delimited at the upper side of the storage body.

3. The storage insert according to claim 1, wherein the receiving structures are formed in the storage body as angled bent sections or notches.

4. The storage insert according to claim 1, wherein the at least one optically transparent section is formed as a through-boring through the storage body; and/or
    wherein at least one row of serially arranged optically transparent sections is formed in the storage body.

5. The storage insert according to claim 1, wherein the storage insert has:
    at least one further optically transparent section between the receiving region and the upper side; and
    at least one further sensor rail, which is configured to be received by the receiving structures, and which has at least one further sensor element in the region of the at least one further optically transparent section.

6. The storage insert according to claim 1, wherein the sensor rail is rigid; and/or
    wherein the sensor rail is formed as a printed circuit board having electrically conductive structures, wherein the at least one sensor element is mounted on and/or in the circuit board and is electrically coupled to the electrically conductive structures.

7. The storage insert according to claim 1, wherein the sensor rail has a plug connector that is electrically connected to the at least one sensor element and to a connector cable.

8. The storage insert according to claim 1, wherein the at least one sensor element has an emitter element for emitting electromagnetic primary radiation and a detector element for detecting electromagnetic secondary radiation in reaction to an emitting of electromagnetic primary radiation when the optically transparent section on the upper side and associated to the sensor element is covered by storage goods.

9. The storage insert according to claim 1, wherein a cable channel is formed at the storage body.

10. A storage device, comprising:
    mounting structures for attaching at least one storage insert;
    wherein the at least one storage insert has a body with an upper side for receiving storage goods, a lower side having receiving structures in a receiving region for receiving a sensor rail; and at least one optically transparent section between the receiving region and the upper side;
    wherein the sensor rail is configured to be received in the receiving region by the receiving structures and has at least one sensor element in the region of the at least one optically transparent section;
    wherein the receiving structures are formed for a drawer-type sliding-in or pulling out of the sensor rail;
    wherein the receiving structures have a mechanical stop for defining an end position of the received sensor rail; and
    wherein the storage body including the receiving structures and the mechanical stop is formed integrally as one piece and one material.

11. The storage device according to claim 10,
    which is formed as a storage rack or a storage cabinet; and/or
    wherein the at least one storage insert is mounted to the mounting structures such that the upper side is inclined with respect to the horizontal; and/or
    wherein at and/or in the mounting structures a cable channel is formed at the at least one storage insert; and/or
    wherein the mounting structures have mounting rods; and/or
    wherein the at least one storage insert is equipped at least partially with goods.

12. A storage management system, having:
    a plurality of storage devices with mounting structures with at least one storage insert attached or attachable to the mounting structures,
    the storage devices arranged with a storage body having:
        an upper side for receiving goods,
        a lower side with structures in a receiving region for receiving a sensor rail, and
        at least one optically transparent section between the receiving region and the upper side;
        wherein the sensor rail has at least one sensor element in the region of the at least one optically transparent section;
        wherein the sensor rail is configured to be received in the receiving region by the receiving structures;
        wherein the receiving structures are formed for a drawer-type sliding-in or pulling out of the sensor rail;
        wherein the receiving structures have a mechanical stop for defining an end position of the received sensor rail;
        wherein the storage body including the receiving structures and the mechanical stop is formed integrally as one piece and one material; and
    a management device, which is arranged to manage, based on sensor signals of the sensor elements, a stock of storage goods on the storage inserts.

13. The storage management system according to claim 12, wherein a specific storage good is associated, in the management device, to each optically transparent section in each receiving section and to each associated sensor element of a sensor rail of a respectively associated storage insert of a respective storage device, and the respective specific storage good is managed as a function of sensor signals of the associated sensor element of the respectively specified storage goods; and/or
- wherein the management device is electrically coupled to the sensor rails of the storage inserts of the storage devices by cable connections; and/or
- having a control center, which is coupled capably to communicate to a plurality of management devices for controlling a stock of inventory.

14. A method, comprising:
providing one of
(i) a storage insert with a storage body having an upper side for receiving storage goods; a lower side having receiving structures in a receiving region for receiving a sensor rail; and at least one optically transparent section between the receiving region and the upper side;
- wherein the sensor rail is configured to be received in the receiving region by the receiving structures and has at least one sensor element in the region of the at least one optically transparent section;
- wherein the receiving structures are formed for a drawer-type sliding-in or pulling out of the sensor rail;
- wherein the receiving structures have a mechanical stop for defining an end position of the received sensor rail; and
- wherein the storage body including the receiving structures and the mechanical stop is formed integrally as one piece and one material, (ii) a storage device with mounting structures for attaching at least one storage insert;
- wherein the at least one storage insert has a body with an upper side for receiving storage goods, a lower side having receiving structures in a receiving region for receiving a sensor rail; and at least one optically transparent section between the receiving region and the upper side;
- wherein the sensor rail is configured to be received in the receiving region by the receiving structures and has at least one sensor element in the region of the at least one optically transparent section;
- wherein the receiving structures are formed for a drawer-type sliding-in or pulling out of the sensor rail;
- wherein the receiving structures have a mechanical stop for defining an end position of the received sensor rail; and
- wherein the storage body including the receiving structures and the mechanical stop is formed integrally as one piece and one material, or (iii) a storage management system having a plurality of storage devices with mounting structures with at least one storage insert attached or attachable to the mounting structures, the storage devices arranged with a storage body having an upper side for supporting goods, a lower side with receiving structures in a receiving region for receiving a sensor rail, and at least one optically transparent section between the receiving region and the upper side, wherein the sensor rail is received in the receiving region by the receiving structures and is arranged with at least one sensor element in the region of the at least one optically transparent section;
- wherein the receiving structures are formed for a drawer-type sliding-in or pulling out of the sensor rail;
- wherein the receiving structures have a mechanical stop for defining an end position of the received sensor rail;
- wherein the storage body including the receiving structures and the mechanical stop is formed integrally as one piece and one material; and
- receiving a signal from the sensor rail indicative of a presence of a good on the storage body.

* * * * *